United States Patent [19]

Csabai

[11] Patent Number: 4,900,341
[45] Date of Patent: Feb. 13, 1990

[54] PURIFICATION SYSTEM

[75] Inventor: Julius S. Csabai, Normandy, Canada

[73] Assignee: Metatron Investments, Inc., Quebec, Canada

[21] Appl. No.: 213,235

[22] Filed: Jun. 29, 1988

[30] Foreign Application Priority Data

Jun. 30, 1987 [CA] Canada .................................. 541061

[51] Int. Cl.⁴ ............................................. B01D 47/00
[52] U.S. Cl. ........................................ 55/222; 55/233;
55/387; 55/DIG. 36; 126/299 E; 261/94
[58] Field of Search ................ 55/222, 227, 233, 259,
55/DIG. 36, 387; 126/299 E, 299 F;
261/94-98, 152

[56] References Cited

U.S. PATENT DOCUMENTS

| | | | |
|---|---|---|---|
| 901,010 | 10/1908 | Jacobs | 55/222 |
| 1,047,534 | 12/1912 | Joseph | 261/96 |
| 3,005,679 | 8/1961 | Morague | 126/299 E |
| 3,302,372 | 2/1967 | Hynson et al. | 261/98 |
| 3,334,470 | 8/1967 | Huppke | 55/90 |
| 3,525,197 | 8/1970 | Sheehan | 55/233 |
| 3,837,269 | 9/1974 | Sweet et al. | 126/299 E |
| 4,036,994 | 4/1977 | Ear | 426/233 |
| 4,251,236 | 2/1981 | Fattinger et al. | 55/222 |
| 4,382,807 | 5/1983 | Diachuk | 126/299 E |

*Primary Examiner*—Bernard Nozick
*Attorney, Agent, or Firm*—Fay, Sharpe, Beall, Fagan, Minnich & McKee

[57] ABSTRACT

The present invention relates to a fume purification system used in conjunction with food cooking equipment. The fumes which are generated during cooking pass through a plurality of filter balls washed by an oxidizing liquid which removes the greasy contaminants from the said fumes. A cooling coil is also used in conjunction with the filter balls to accelerate the condensation of the fumes. If required, a charcoal filter is placed before the purified air is returned to the atmosphere or recirculated in the system.

16 Claims, 3 Drawing Sheets

PURIFICATION SYSTEM

TECHNICAL FIELD

The present invention relates to a fume purification system used in conjunction with food cooking equipment.

DESCRIPTION OF THE PRIOR ART

Fume removal systems are widely used in commerical and residential environments. The use of a fan which expels a part of the fumes and a portion of the neighbouring air into the atmosphere is well known. In most instances, it is used in association with a canopy exhaust hood which captures the fumes from the cooking area and a filter which removes the particulate matter and sometimes a portion of the gases contained in the fumes. However, such filters get rapidly clogged up with the resulting loss of filtering efficiency.

U.S. Pat. No. 4,036,994 (EAR) describes a method for reducing odor and smoke emissions by using an oxidizer such as hydrogen perioxide to scrub the fumes during their exit to the atmosphere. However, this system is highly imperfect in that a significant portion of the fumes is still released in the atmosphere while the used water/scrubber is evacuated into the sewage system.

U.S. Pat. No. 3,525,197 (SHEEHAN) presents a purification system for removing dust from an air stream. The air stream enters in the system by a duct directed downwardly and then the largest air flow particles are collected in a container in the bottom of the system. The air is then passed through a plurality of hollow impingement elements. These elements are periodically washed by a liquid to remove the dust or other contaminants which may have adhered on them.

It is not possible to use this system to clean fumes because the condensation of fumes would principally occur when the air stream is washed by the liquid, i.e. in the upper part of the apparatus, which would not be sufficient to provide an efficient system. Furthermore, the greasy particles would also obstruct the hollow impingement elements.

U.S. Pat. No. 3,334,470 (HUPPKE) shows another dust removal system wherein a pair of nozzle means are provided for directing the gas into a high velocity stream. The nozzles converge towards each other, thus causing the liquid and gas in each stream to collide above the liquid bath, in which the contaminated liquid is collected.

The operation of this system is complicated. In addition, a large quantity of collecting liquid such as water is wasted in the drain located in the bottom of the apparatus.

It is not possible to use this sytem to clean fumes because the collected particles would obstruct the filter elements.

DISCLOSURE OF THE INVENTION

It is an object of the present invention to provide a purification system which eliminates the above mentioned disadvantages.

Another object of the present invention is to provide a purification system which removes grease, smoke or other particles from fumes.

A further object of the present invention is to provide a purification which is easy to clean and particularly suitable for easy retrofitting of operating restaurants.

Still another object of the present invention is to provide an effective closed-circuit purification system which is efficient, economical, easily installed and has low maintenance costs.

A still further object of the present invention is to provide a fume purification system to be used in a fried food dispensing machine.

A purification system in accordance with the present invention comprises a container having an oxidizing liquid bath in the bottom of said container, a plurality of balls placed inside the upper portion of said container, inlet and an outlet means connected to the hood of the cooking surface and a blower to suck the fumes away from the cooking surface.

BRIEF DESCRIPTION OF THE DRAWINGS

In order that the invention may be understood and easily used and so that the foresaid objects and others may become apparent, a purification system in conformity with the invention will be described, but only as an example, in the following drawings of which.

DETAILED DESCRIPTION OF A PREFERRED EMBODIMENT

Figure 1:
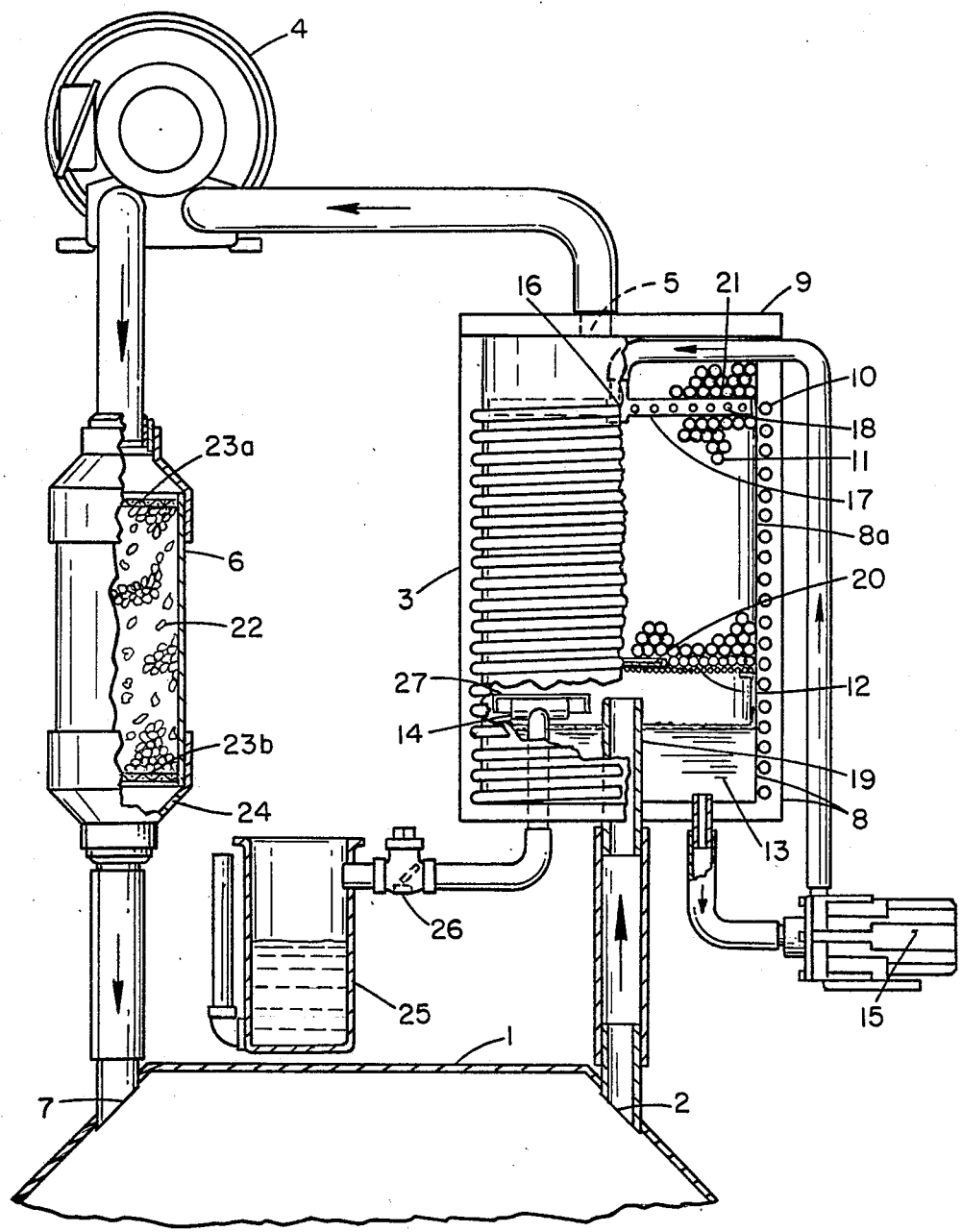
FIG. 1 is a side view of one embodiment of the present invention.

The purification system shown in FIG. 1 is more particularly adapted for use in a self-contained fried food dispensing machine. The typical food items which are prepared in such machines are french fries, onion rings, chicken or fish nuggets, etc.

According to the embodiment shown in FIG. 1, fumes generated during cooking of food products in the hot oil bath are collected, purified, cooled and recirculated. Since the food products handled here all have very high percentage of water content (over 90%) the largest constituent of the exhaust fumes is water vapour and steam. Other components of the emission fumes are a family of noncondensible gases which result from the high temperature exposure and the gradual degradation of the cooking oil and of the animal fats contained in the products used. There is also a certain amount of particulate matter and gasified oil/fat residues present in this blend of gases.

Figure 2:
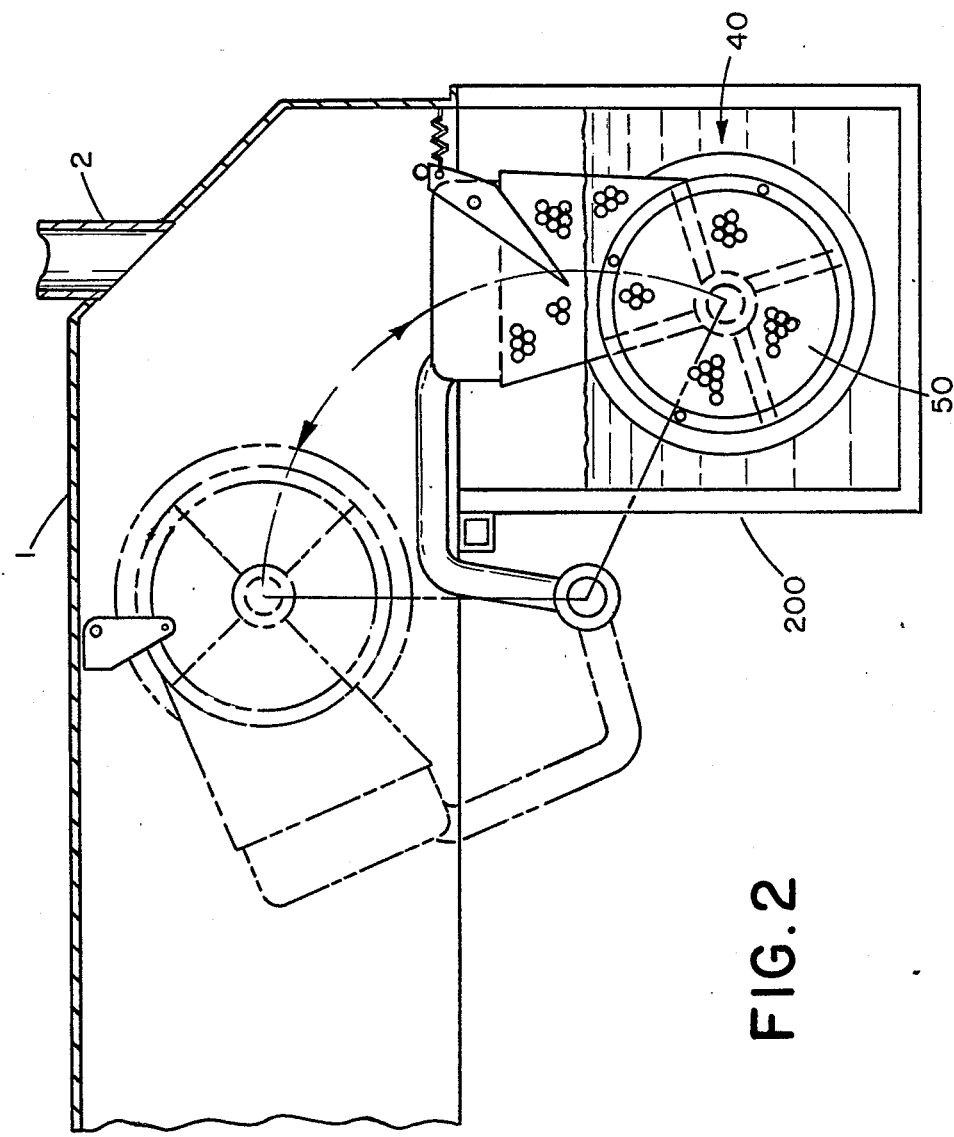
FIG. 2 is a side view of the hood of the present invention mounted over a fired food dispensing machine so as to form a closed circuit purification system.
Figure 3:
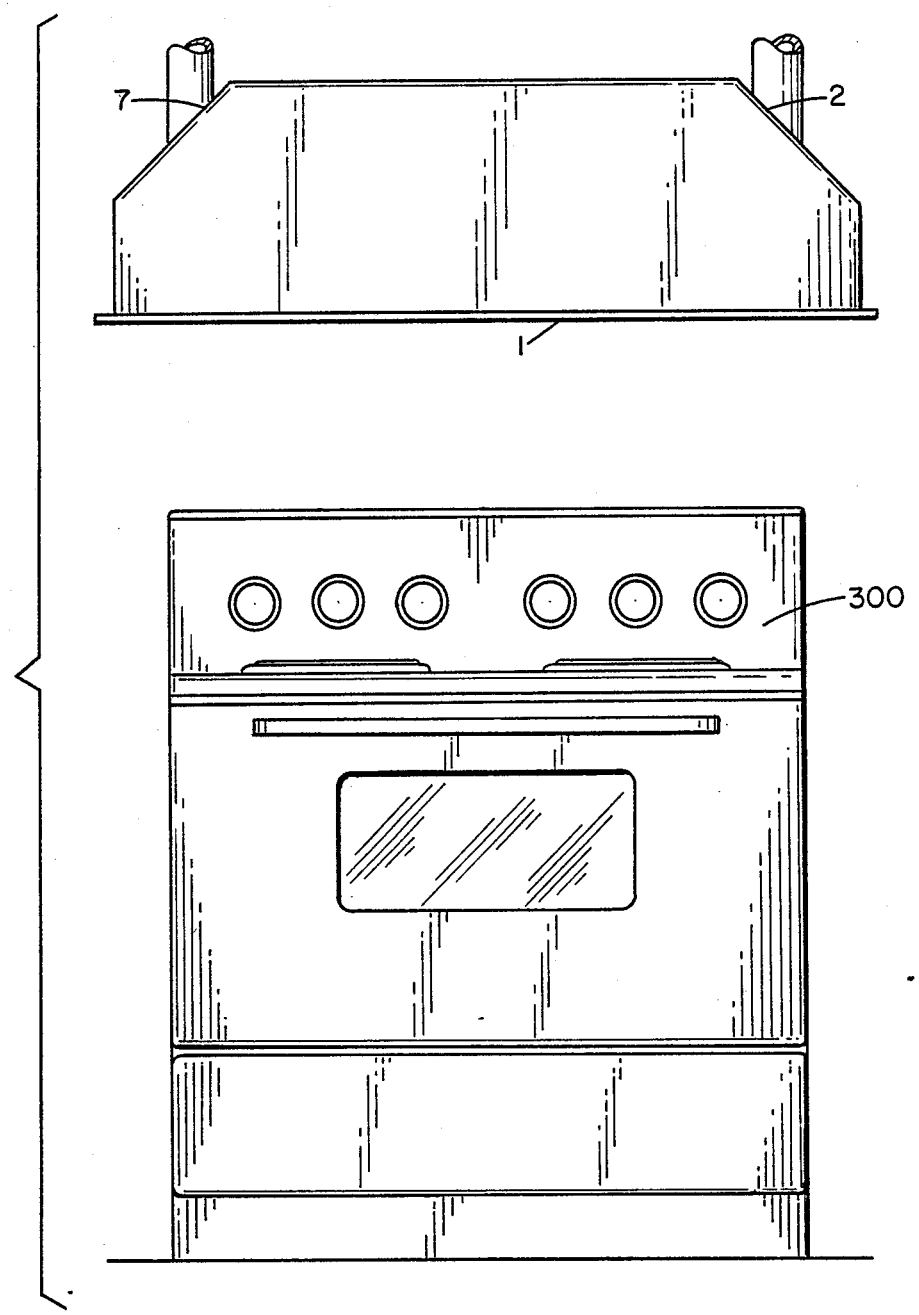
FIG. 3 is a side view of the hook of the present invention mounted over a conventional stove.

Gases produced during cooking and oil heating are collected and confined in a fully enclosed hoos 1 which is mounted right over the frying assembly generally referred to as 200 in FIG. 2 and 300 in FIG. 3. The frying assembly of FIG. 2 comprises a rotating basket 50 wherein the food to be cooked is placed. Said rotating backet is immersed in an oil bath 40 for the cooking. An exhaust port 2 is located on one side of the hood where the gas generation is concentrated. From here the gases are sucked into the condenser unit 3 where most of the gas purification and conditioning takes place.

In FIG. 1, a blower 4 incldes suction to extract the partially processed gases from exit port 5 of the condenser, and pushes it through the filter cartridge 6 for complete cleaning before re-entering into the hood at inlet port 7.

Condenser 3 itself is fabricated from a double walled 8, cylindrical container which is equipped with a double wall cover 9. On the outside surface of the inside shell 8a, a copper tube coil 10 is wound and soldered (for better conductivity) to provide controlled cooling. Inside the condenser a large number of solid glass balls 11 having a predetermined diameter (for example, ½") are packed and supported on a circular wire mesh 12. The bottom part of the condenser is filled with a 2½ percent potassium permanganate and water solution 13 up to the level of an overflow "T" 14. This solution is being circulated continuously in a closed circuit loop by a pump 15 at a rate of about 5 GPM through the entire glass ball packing.

A spray head 16 is provided fro even distribution of the solution 13. It consists of a centrally located hollow hub and four symmetrically arranged lateral, tubular branches 17. Holes 18 are drilled horizontally on these branches to create numerous, calibrated spray nozzles. These nozzles 18 are made to create a perfectly optimal distribution of solution. In practice it has been found to be very effective to direct about ⅔ of the circulated flow through the glass balls and ⅓ against the chilled, vertical inside wall 8a of the cylinder. This way a uniform capillary coating on the glass balls is attained for efficient scrubbing of the counter-flowing gases. At the same time the solution flowing down on the walls, is chilled to absorb the heat picked up from the hot emissive gases.

The effects of the gases thus passing through this chilled mass of wetted glass balls are the following:
(a) The water content of the gases is condensed by the cold temperature;
(b) The potassium permanganate solution oxidizes a large percentage of the combustion gases.
(c) The impingement of gas molecules on the wet spherical surfaces of balls captures the microscopic, solid particulate matter; and
(d) The vaporized fat and oil content of the emissive gases are cast out by solidification in the low temperature environment.

The gases enter into the condenser through a tubular inlet 19 which is raised slightly higher than the level of the solution at rest which is determined by the level of overflow 14. The circular plate 20 mounted on the mesh support has a dual function. It deflects the incoming gas stream laterally for even distribution at the bottom line of the ball packing, and it also prevents the cascading solution to fall into the inlet opening 19.

Several layers 21 of glass balls cover the spray head 16 in order to prevent mist generation of solution (and subsequent humdification of scrubbed gases) by minimizing the spray stream length as the solution passes through the orifices 18.

From the condenser 3, via the high speed blower, the dry and partially reconditioned gases enter into the tubular charcoal cartridge 6. A compacted bed of activated charcoal 22 is disposed between two wire mesh partitions 23a and 23b. The well established absorbtion technology of activated charcoal completes the removal of any remaining odor and gas constituents of the gases before re-directing the remaining portion (air) into the hooded enclosure 1 via inlet 7. A certain percentage of this purified air is expelled through a calibrated orifice 24 which is located on the exit side of the cartridge. This is provided to ensure a partial vacuum inside the enclosure 1 over the cooking zone. The objective of this provision is to prevent unpurified gases from leaking through any loose sealing of doors and/or bolted connections.

As mentioned earlier, the overflow 'T' fitting 14 in installed to control the quantity of solution residing inside the condenser 3. This provision is necessary because the water content of the emissive gases is continuously added to the solution by condensation. Another function of this feature is to dispose of the layer of fat-/oil precipitated in the scrubbing process. This way, therefore, the surplus solution and fatty slime is disposed into the water tank 25 via piping and a check valve 26. One directional operation of this valve prevents air from entering from the tank 25 into the condenser 3 which is under negative pressure.

A cap 27 functions similarly to plate 20 to prevent drops of the cascading solution from entering into the overflow opening of "t" fitting 14.

It is important that the cover 9 be easily removable to allow access to the interior of the cylinder to clean or repair it.

While a particular and preferred embodiment of the invention has been described, it is contemplated that various changes of materials and arrangements of the various may be made by those skilled in the art within the spirit and scope of the present invention.

Accordingly, it is intended that the scope of the invention not be determined solely by reference to the embodiment described but rather be determined by reference to the claims hereinafter provided and their equivalents.

I claim:

1. A purification system for removing contaminants including particles and gases from fumes generated from a cooking area, said system comprising:
    a container having an upper portion and a lower portion, said container including an inlet in said lower portion and an outlet in said upper portion;
    a plurality of stationary filter elements disposed in said container;
    means for cooling said filter elements, said cooling means used to increase the condensation of said fumes;
    means for holding said filter elements, said holding means used to keep said filter elements at a certain distance from said inlet of said container;
    means for cleaning and wetting said filter elements, a portion of said filter elements being disposed above said cleaning and wetting means;
    means for collecting liquid, contaminant particles, and condensed gases, said collecting means disposed in said lower portion of said container; and,
    means for inducing negative pressure, said inducing means connected to said outlet of said container.

2. A purification system according to claim 1 wherein the filter elements are spherical glass balls.

3. A purification system according to claim 1 wherein the collecting means includes a reservoir connected to said container.

4. A purification system according to claim 1 wherein the collecting means comprises a 'T' shaped inlet located in the lower portion of said container, and a reservoir connected to said 'T' inlet.

5. A purification system according to claim 1 wherein a charcoal cartridge is placed just after the negative pressure inducing means.

6. A purification system according to claim 1 wherein the container has a removable cover, the filter elements are stationary balls laid on a wire mesh situated above the container inlet, the wetting and cleaning means includes circulating means, a spray head connected to a series of tubular branches, a cooling coil surrounds the outside surface of the inside shell of said container, the plate is placed above the container inlet and a charcoal cartridge is placed above the container inlet and a charcoal cartridge is placed just after the negative pressure inducing means in order to complete the purification.

7. A purification system according to claim 1 further comprising a hood disposed over said cooking area to collect said fumes wherein the container inlet and outlet are connected to said hood in order to form a closed-circuit system.

8. A purification system according to claim 7 wherein a charcoal cartridge is placed just after the negative pressure inducing means, this charcoal cartridge further includes at least one calibrated orifice on the exit so as to insure a partial vacuum inside said hood disposed over said cooking area.

9. A purification system according to claim 17 wherein said cleaning and wetting means includes an oxidizing liquid and means for circulating this liquid over said filter elements.

10. A purification system according to claim 9 wherein a charcoal cartridge is placed just after the negative pressure inducing means.

11. A purification system according to claim 9 wherein the circulating means comprises a spray head connected to a series of tubular branches to uniformly distribute the oxidizing liquid.

12. A purification system according to claim 9 wherein the cooling means includes a refrigeration coil which surrounds the outside surface of said container.

13. A purification system according to claim 9 wherein a plate is disposed above said container inlet in order to prevent the oxidizing liquid from entering into said inlet.

14. A purification system according to claim 9 wherein the collecting means comprises a "t" shaped inlet located in the lower portion of said container, and a reservoir connected to said "t" shaped inlet.

15. A purification system according to claim 9 wherein a charcoal cartridge is placed just after the negative pressure inducing means.

16. A purification system for removing contaminants including particles and gases from the fumes generated from a cooking area, said system comprising:
 a container having an upper portion and a lower portion, said container comprises an inlet in said lower portion and an outlet in said upper portion;
 a plurality of stationary spherical glass balls disposed in said container;
 means for cooling said glass balls, said cooling means used to inrease the condensation of said fumes;
 means for holding said glass balls, said holding means used to keep said balls at a certain distance from said inlet of said container;
 means for cleaning and wetting said glass balls, a portion of said cleaning and wettingmeans disposed in said lower portion of said container, said cleaning and wetting means includes an oxidizing liquid;
 means for collecting liquid, contaminant particles, and condensed gases, said collecting means disposed in said lower portion of said container;
 means for inducing negative pressure, said inducing means connected to said outlet of said container;
 wherein the cooling means comprises a refrigeration coil which surrounds the outside surface of said container; a hood disposed over said cooking area to collect said fuels and said container inlet and outlet are connected to said hook in order to form a closed circuit system; a charcoal cartridge is placed just after the negative pressure inducing means, a plate is disposed above said container inlet, in order to prevent the oxidizing liquid from entering into said inlet, the contaminant particles and condensed gases collecting means includes a "t" shape inlet located in the lower portion of said container and a reservoir is connected to said "t" inlet.

* * * * *